Dec. 7, 1965 C. STRACHEY 3,222,647

DATA PROCESSING EQUIPMENT

Filed Feb. 4, 1960

United States Patent Office
3,222,647
Patented Dec. 7, 1965

3,222,647

DATA PROCESSING EQUIPMENT

Christopher Strachey, London, England, assignor, by mesne assignments, to International Business Machines Corporation, New York, N.Y., a corporation of New York Filed Feb. 4, 1960, Ser. No. 6,752
Claims priority, application Great Britain, Feb. 16, 1959, 5,263/59
1 Claim. (Cl. 340—172.5)

This invention relates to electrical data processing equipment and to methods of operation therefor, and more particularly, but not exclusively, to digital computers.

The speed of operation of computers continues to increase and computer designs now contemplated, and by no means impracticable, are of the order of a thousand times faster than the early electrical computers of not much more than ten years ago.

Even with the early computers, directly the idea arose of using them for repetitive, relatively simple programs, the problem arose of introducing and extracting information to be processed at sufficient speed to keep the computer efficiently occupied.

The prime sources of input and the ultimate recorders of output were relatively very slow in operation, and buffer equipment was introduced in which a gear change took place: information was received at one speed and sent out at increased speed to the computer. By using several sources of this type the computer could be kept reasonably occupied.

The speeds of prime sources of information have been much increased, but there has also been a remarkable increase in computer speed, so that the problem of efficient user of computer time continues, and is the more urgent since although the potential increase in capacity is relatively much larger than the corresponding increase in cost, its value depends on the ability to use it effectively.

There are activities in which a computer is, at present, very inefficiently used. One of these is program checking. For many purposes the best method of program checking is for a skilled programmer to sit at the operating console of the machine and to plan his operations according to the results produced by the machine. Unfortunately this method is so grossly wasteful of machine time, even with relatively slow machines, that it is generally not allowed except for a few very special problems. The concept of time sharing between operators makes it possible once more to allow this manual program checking at a special console, without seriously interfering with the amount of machine time available for ordinary computing.

Another activity which makes very inefficient use of a computer is the maintenance and adjustment of the peripheral equipment such as paper tape readers and magnetic tape units. Some of these need a considerable amount of adjustment which can only be done satisfactorily by using the computer. If this part of the maintenance is carried out on a time sharing basis, it should be possible to reduce the total machine time used for maintenance quite considerably.

Several new problems appear as soon as it is contemplated to have several variable programs in the machine at the same time. The most important of these is the necessity of ensuring that the programs do not interfere with each other. This is particularly important, of course, if one of the programs concerned is still under development and so is unpredictable. The solution to this difficulty is to provide for interlocks on the main store so that each program is restricted to altering (and perhaps also to reading) numbers in its own section of the store. This in its turn introduces the problem of altering the interlocks. It is evident that it must be possible to change them when required, or it would be impossible to use the whole machine on a single large problem, and for reasons of speed it is obviously desirable to have them altered by a machine instruction. The problem is to ensure that even if a program obeys a completely unpredictable series of orders, it still shall not be able to alter the interlocks and spoil another program.

The other rather difficult problems are concerned with the best method of program checking on a machine of this sort. The majority of programs (and programmers) are not suitable for the manual checking methods. It is therefore necessary to make some provision for other methods of program checking, and it is likely that there will be a considerable amount of this work. A particular problem which arises in this context is the difficulty of determining when a program under test is in error and has come to a loop stop. If this is not detected rapidly, it can waste a disproportionate amount of computer time.

Even now the state has ben reached, when the attempt to utilize a computer efficiently for the various types of purpose which they are required to serve has led to such complexity of input equipment and output equipment from a number of sources that the computer itself becomes overshadowed in size and cost by its ancillary equipment.

Further, the haphazard and uncoordinated use of computers from a number of different input stations for purposes some of which can be extremely wasteful of computer time poses a problem which becomes more and more acute as the speed of operation, and cost, of computers increase. It is current practice to arrange the computer logic so that a preferred station can break in on a current computation, and cause the current instruction and the state of affairs within the logic in carrying out the instruction to be stored, so freeing the logic for handling a preferential instruction from the preferred station.

However, such a proposal is of very limited application because the need to extend such a thought to cater for the various types of program and the conflicting needs of a number of different stations would complicate and increase the cost of the logic to an undesirable extent.

An object of the present invention is to provide flexible and economic facilities within the computer, which can handle the above problem however complex it becomes.

The foregoing and other objects, features and advantages of the invention will be apparent from the following more particular description of the preferred embodiment of the invention, as illustrated in the accompanying drawings.

It is proposed to achieve these objects by means of a master program designed to cater automatically for the conflicting demands of a number of stations of different types within a predetermined basic plan incorporated in a coordinating set of instructions which will be called the Director. By means of this program, together with a small fixed amount of additional equipment, all the conflicting interests and diverse requirements can be automatically interwoven into an automatically-coordinated whole which utilizes the computer time on an efficient and economic basis. It will be appreciated that by having a long-running base load program of lowest priority which would come into operation in gaps between programs of higher priority and short duration, the computer can be kept fully occupied: such low priority programs can be routine test programs or program checking from a console.

Each item sent by a station will be treated, so far as transmission is concerned, as a separate message and will be preceded by an "interrupt program signal, which is sent on its own, transmission of the item awaiting a "proceed-to-send" signal from the computer. The computer checks the priority of a station from which an "interrupt program" signal is received in relation to the current program and the "proceed-to-send" signal is sent immediately if the existing program is to be interrupted, or is delayed until the turn of the station in question in a waiting queue based on priority, and possibly length of waiting time as between stations of equal priority.

A program priority determined either by the type of input channel whence the program has come, or by an indicator at the end of the program, is applied via a local channel to a priority comparator, and the program is thus entered for consideration as such, and will be carried out in its proper turn in one or several attempts depending on the incidence of more urgent programs.

The first important characteristic of the Director is that it is a fixed program. This means that it can, and should, be kept in a special part of the store which is non-erasable. It is a fortunate fact that it is relatively cheap and easy to provide such a store with a very fast read-out time (of the order of ⅕ μs.). This reduces the time spent in the Director and ensures that the program of the Director can never be destroyed.

The second fact is that the Director requires some working space preferably immune from interference by other programs. That is to say that we require some ordinary erasable store which can only be altered by instructions in the Director.

The fact that the Director is in a special fixed part of the store makes it possible to introduce machine instructions which are only accessible to the Director. If the instructions which alter the main store interlocks are of this sort, it is quite easy to arrange that no program can alter the interlocks of any other program, and thus to give protection against unpredictable programs.

The Director on the other hand is not solely hardware, but a Program, an Order, to some extent conditional, and fundamentally involves very little special equipment, although as will be discussed later the computer Director, is dealing with equipment which can normally handle one problem at a time, or a small number of simultaneous processes compared with the number of simultaneous demands it is likely to meet, and when it is faced with a number of simultaneous demands on its services, it has to adjudicate between the conflicting requirements, to arrange for any existing program to be stored while another of higher priority is handled, to formulate and handle a queue of waiting demands arranged according to a priority code, and if desired to adjust the logic so as to process signals from an input source into the computer code.

The vital part to be played by the Director makes it very desirable to ensure that the likelihood of a mistake occurring in its operation, or the operations it controls, is reduced to a minimum.

For this reason, the Director program is preferably housed in a non-erasable exclusive store. Sections of the main store can temporarily be allocated to particular types of program, or particular programs, and addresses relating to particular instructions are examined to determine that they are within the address group exclusively allocated to programs of that particular type, or to that particular program.

To prevent one variable program interfering with another, each program is required to be compact in the store. This is quite easily arranged if automatic coding is used. During input operations the Director assigns an unused block of store to the problem, inserts the relevant addresses in the instructions and establishes the store limits inside which the problem must lie. While the problem is being run these limits are held in two special limit registers and are compared with the address register of the main store every time this block is used. If the address called for is not in the correct part of the store an error is indicated in the Director. This comparison need not slow down the process of reading from store. It can proceed in parallel with the read-out, and if the address is out of limits, the same number is merely written back into the store again.

The instructions setting the limit registers are only available to the fixed store, and it is part of the function of the Director to set them correctly whenever control is moved to a fresh program. The allocation of store is thus a function of the Director. Any program can remove itself (for example when it comes to an end) but no variable program can remove another. Only the Director, can forcibly remove a program, and it will only do this if there is a program error, e.g., a call for a number outside its limits, or if the program overruns its time limit.

When fixed programs are required to use part of the store belonging to a variable program, the program, or the Director, will check on first entry that the part of the store they are being asked to use is a permissible one. It is also desirable to provide a temporary lockout while transferring blocks of data to and from magnetic tape. This can be done if there is a parity check bit on words in the main store. The suggestion is that the parity bit should be reversed for the period when it is necessary to lockout the main computer, but not the magnetic tape fixed program. This involves providing instructions, accessible only from the fixed store, for reading and writing in the main store with reversed parity. An attempt by the main program to read a word with reversed parity would lead, as all error indications would lead, to a sequence in the Director. This would determine whether a magnetic transfer involving that address was in process. If it were, it would delay the main program: if not, it would signal a store error.

The invention will be described with reference to the accompanying drawings.

GENERAL DESCRIPTION

Figures 1, 2:
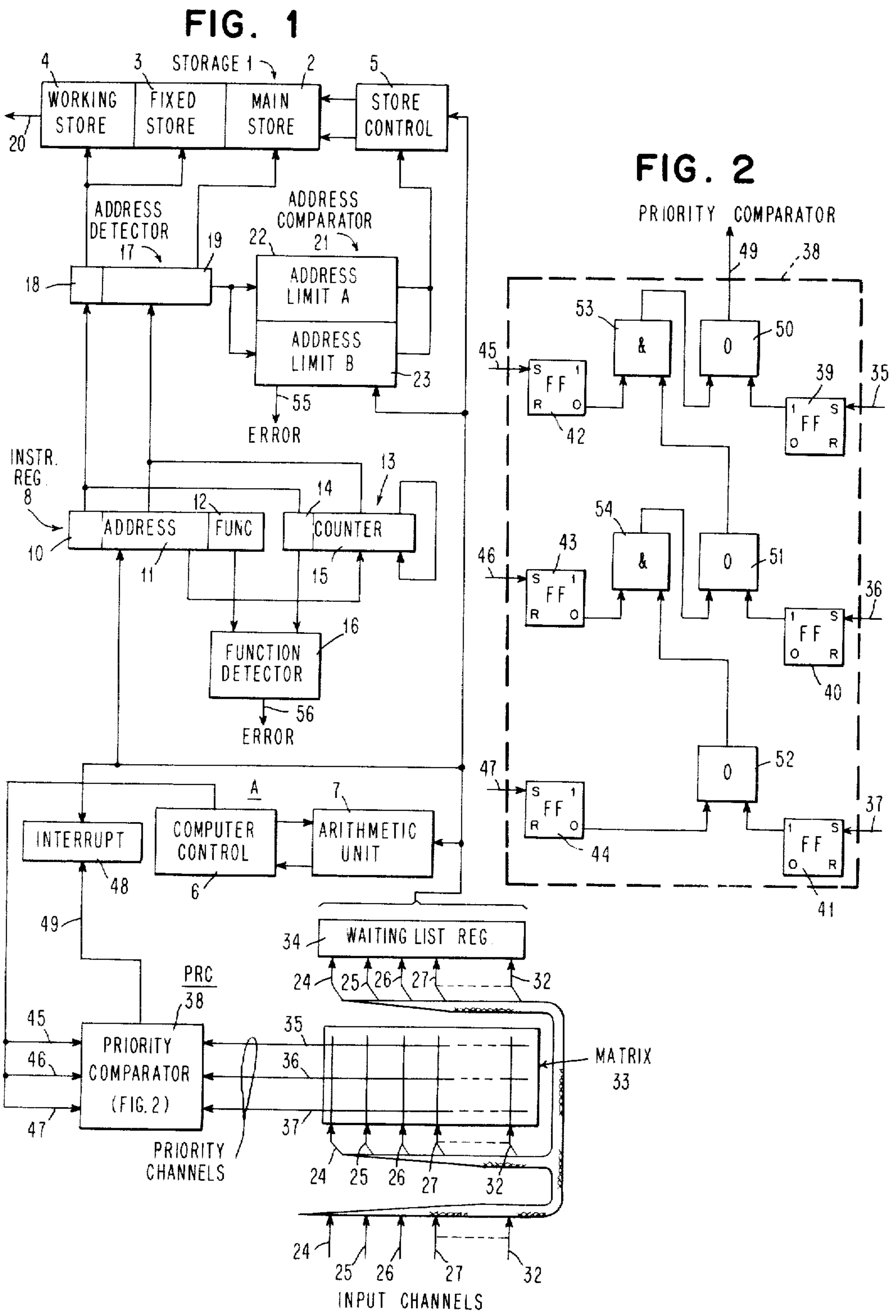
FIG. 1 shows schematically the essential parts of a computer embodying the invention.
FIG. 2 shows a logical circuit (PRC in FIG. 1) for priority comparison.

The input stations can be of any desired types, and can transmit information in different codes, the computer being utilized if desired to translate incoming information from various codes to the computer code. It is however necessary to feed information into the computer at high speed.

The amount of information to be transferred to the computer in one operation varies according to the working speed of the input station and the way in which the task of speed change between station and computer is allocated as between the station itself and the computer. Thus, in some cases, the discrete information item can be a single bit, in other cases, a character, in others a word. However, in every case the complete set of information to be transmited will be sent in a series of discrete items, so that reception always poses the same basic problem, although the extent of the problem varies. Each item sent by a station will be treated, so far as transmission is concerned, as a separate message and will be preceded by an "interrupt program" signal, which is sent on its own, transmission of the item awaiting a "proceed-to-send" signal from the computer. The computer checks the priority of a station from which an "interrupt program" signal is received in relation to the current program and the "proceed-to-send" signal is sent immediately if the existing program is to be interrupted, or is delayed until the turn of the station in question in a waiting queue based on priority, and possibly length of waiting time as between stations of equal priority.

For the computer also, each item involves a separate program, but in addition the succession of separate programs involved in a complete set of information have to be coordinated. The coordination will vary according to the size of the individual item. If the item is a word, the Director will apply a program for character and word parity checks, if used, and automatically cause the word to be transferred from the incoming word register to the main store in well known manner (for example, see U.S. Patent 2,850,234 issued September 2, 1958, "Magnetic Record Input-Output Device for Calculators," Bartelt et al., assigned to the International Business Machines Corporation) at an address which may be part of the first word received or may be automatically allocated by the Director. If the item is a character, the Director will apply the character parity check to each item received, and will transfer the character to part of the working store automatically allocated by the Director: on receipt of each succeeding character, the stored character or characters is or are transferred down to the incoming word register until a word is completed on which transfer to the main store takes place. Bit items are handled in a manner similar to character items. A progress report on the transfer to the computer is recorded in the working store between items and is used by the Director each time an "interrupt program" signal has been received from the station in question and made operational, to determine, for instance, that the item to be received forms part of a partly-received set of information. The Director may cause code translation to be applied, character by character, or word by word, prior to transfer to the main store, or to be applied to the complete set of information in the main store when an end-of-message signal is identified in the incoming word register.

At the end of the assembly of an incoming program in store, a program priority determined either by the type of input channel whence the program has come, or by an indicator at the end of the program, is applied via a local channel to a priority comparator, and the program is thus entered for consideration as such, and will be carried out in its proper turn in one or several attempts depending on the incidence of more urgent programs.

Transmission of results to output stations will be handled as follows. An arithmetic program will terminate with instructions to bring in the Director to signal the output station and to make suitable records in the working store for progressing the transmission. The output station will then initiate a series of programs to cause transmission of individual bits or blocks of bits according to its mode of operation.

The Director will be constructed to take care of all basic possibilities in the operation of the computer in handling overlapping requirements and will be able to call for additional instructions, to be interpolated among the instructions of the Director, from the fixed store in certain contingencies.

It will be understood that the computer can be of any known type, but for the purposes of ease of explanation, it will be described as applied to a computer designed to use instructions stored in a sequence of addresses in a store and in which each instruction essentially comprises an operand address and a function identification only.

DETAILED DESCRIPTION

*Computer circuits.*—In FIGURE 1, the main store 2, a fixed store 3, and a working store 4 are shown as part of the same storage structure 1, which may be a magnetic matrix. The fixed store 3 is preferably of a type in which read-out is non-destructive, although the remainder may be of the conventional core type in which readout destroys the record.

The store control circuit 5 is designed to handle both destructive and non-destructive readout in well known manner, or separate controls can be used. A main control circuit 6 of the computer is associated with the arithmetic unit AU which will of course be designed to provide such operational facilities as are required. An instruction register 8 includes an operand address section 9 (comprising a discrimination section 10 and a main section 11), and a function section 12. Because the instruction addresses are normally in sequence, a counter 13 (comprising a discrimination section 14 and a main section 15) is used to act as the instruction address, normally advanced one between instructions, but being capable of receiving overriding instruction addresses from instruction register 8, or stores 3 or 4 as a conventional transfer, for Director operation.

The function detector 16, which may be a diode matrix, decodes the function identity 12 in the instruction register 8 and adjusts the setting of the main control circuit 6 in well known manner (for example, see Chapter 11, R. K. Richards, "Arithmetic Operations in Digital Computers," D. Van Nostrand Co., 1955) for causing the arithmetic unit 7 to carry out that function. Similarly, the address detector 17 (comprising a discrimination section 18 and a main section 19) decodes the addresses from the instruction register 8 and counter 13 as required and controls the reading of the operand or instruction in question in well known manner via a bus 20 to its appropriate operational position.

Associated with the address detector 17 is an address comparator 21 (having limit sections 22 and 23) whose function is to determine whether the address in the address detector 17 is within certain limits A and B, which vary from time to time under control of the Director as will be explained later under the heading, "Operation." Discrimination sections 10, 14 and 18 are shown separately in the respective devices 8, 13 and 17 to indicate that a portion of an address will have different values differentiating among stores 2, 3 and 4. Similarly, the function detector 16 will be arranged to give an error signal on line 24 if it receives a Director function without a signal from a discrimination section 14: The counter 13 indicates that a Director-controlled instruction is being handled, or if a non-Director function has been received in association with a Director address.

If the discriminator section 18 of the address detector 17 receives an address code identifying store 3 or 4 instead of store 2, the selection will be directed accordingly.

*Allocation circuits.*—The allocation of the computer to input channels 24 through 32 is illustrated at the bottom of FIG. 1. All such channels 24 through 32 are connected to a diode matrix 33 by means of which a priority is allocated to each channel. There will usually be many more channels than there are priorities, but of course cases may arise in which each channel has a priority of its own, in which case the matrix 33 is not required. The incoming channels are also connected to a waiting list register 34 which records incoming "interrupt program" signals for queueing purposes as explained below under the heading, "Operation." The matrix 33 cross-connects each channel to one of the priorities channels 35, 36 and 37, for instance by means of diodes in well known manner (for example, see FIG. 9–45, S. H. Caldwell "Switching Circuits and Logical Design," John Wiley & Sons, 1958).

As shown in FIGURE 2, the priority channels 35, 36 and 37 are connected to flip-flops 39, 40 and 41, in a priority comparator 38, arranged to compare the priority of each incoming signal with the priority of the current program (from lines 45, 46 and 47), which is recorded in one of the bistable flip-flops 42, 43 and 44. If an incoming signal has a higher priority than the current program, or, maybe, is of equal priority, a signal is sent on line 49 (FIGS. 2 and 1) to an interrupt circuit 48 by means of which the Director is brought into operation, and computer control 6 and arithmetic unit 7 are momentarily stored in their existing condition. Logical circuits 50, 51 and 52 are OR gates and 53 and 54 are AND gates. In the bistable flip-flops, the upper bistable condition 1 occurs in response to the incoming respective priority and the present respective priority.

The circuits are so arranged that an incoming priority will signal the interrupt circuit 48 if the current program is of the same or lower priority. Thus, a signal on priority channel 35 will operate flip-flop 39 to the 1 condition and will transmit a signal through the OR gate 50 to line 49. If however a signal on priority channel 36 operates flip-flop 40 to condition 1 a signal will be transmitted through OR gate 51 to AND gate 53, but AND gate 53 will not be opened if flip-flop 42 is in condition 1; in other words if the current priority is higher than the incoming priority. It will be noted that a priority signal incoming from flip-flop 41 will pass through AND gate 54 if flip-flop 43 is in condition 0, and through OR gate 51, but will be blocked at AND gate 53 if flip-flop 42 is in condition 1.

If, however, flip-flop 42 was connected to another AND gate (not shown) between OR gate 50 and line 49; flip-flop 43 is connected to AND gate 53; and so on, an incoming priority would be able to signal line 49 if the current priority were lower.

OPERATION

If desired, operations such as multiply can, if in progress, be allowed to continue to completion. The Director next extracts an indicator word from store 4 or 3 by means of which a check is made of the waiting list register 34 to determine which incoming channels of the priority in question are awaiting attention, after which an intra-class priority list is automatically extracted from store 4 or 3 and determines from the results of the previous check which waiting channel within the class requires attention first. If this is the program which has been interrupted, it is reinstated and proceeds. If the new program takes precedence, the Director causes the contents of the counter 13 relating to the interrupted program to be sent to the working store 4 so that the interrupted program can be restored later at the point of interruption. The Director next determines from consideration of the type of program which has been interrupted, and the type of program which is interrupting, what off-normal conditions in the computer control 6 and arithmetic unit 7 need storing and controls the required storage in the store 4.

If instead of program interruption, the current program ends normally, the Director program is automatically brought into use to step the position of the operated bistable flip-flop among flip-flops 42, 43 and 44 step by step downwards in well known counter fashion until either the interrupt circuit 48 is operated, or flip-flop 44 (or any further priority device) is operated without any reaction on the interrupt circuit 48 thus indicating that there are no waiting programs. If the interrupt circuit 48 is operated it brings in the Director. In this case, the initial instruction of the Director produces no result.

It would of course be possible to arrange that there was no provision for program interruption, the priority comparator 38 being interrogated at the end of each program.

It is to be understood that those of the operations which were described above without reference to hardware are in fact carried out by the normal facilities of the arithmetic unit 7 under control of Director instructions and do not involve any special equipment, and can be carried out by any known general-purpose arithmetic unit 7 (for example, those described in the R. K. Richards book and the Bartelt et al. patent referenced above), and this applies to succeeding description also.

The next stage of the Director program is to select the waiting program of highest priority, or one of them if more than one of the same priority. It is however possible to take into account waiting time by advancing a time record for each waiting call once per major cycle and examining these records to determine the largest within a priority by means of a Director instruction each time the selection of a program for processing is required. Alternatively waiting time can be ignored.

The channels incoming to the matrix 33 can, of course, include not only input channels, but locally originating program requirements, such as error programs, regular-routine programs, and output requirements. The Director also checks whether the new program is a continuation of previous programs forming part, for instance, of an output, or of the assembly of an incoming arithmetic program.

When past history is involved the Director extracts its record from working store 4, controls the current step in the overall program, and the transfer of the current partial assembly to store 4, if still incomplete, or to the main store 2 if complete.

The allocation of storage space in store 2 for incoming programs is relatively simple. The actual number of programs competing for attention at any time may be quite small, and provision of not more than four or five addresses for that purpose may be quite adequate. If the termination of a completed overall program is followed by the commencement of a program without a history, it can of course be allocated the address which has been occupied by the completed program. Otherwise a process of reading, checking, and rewriting the contents of the early part of each of the small number of addresses allocated for this purpose until an empty address is found presents no difficulty to program. On allocation, the address will be stored in working store 4 with the identity of the input channel to which it is allocated for use in controlling the assembly of the sections of the incoming arithmetic program in the allocated store address. Each time an input program occurs on the input channel in question, the address limits of the allocated store are transferred to address comparator 21 in such a manner as to check that the instruction address is within the limits of the allocated store. There are various known ways of carrying out this check. For instance, the digits of the instruction address can be presented in turn in synchronism with the corresponding digits of the two limits A and B to digit comparators for determining that the address digit is the same as, lower than, or higher than, the limit digits according to requirements. If an out of limit digit is detected, a signal will be given via error line 55 to initiate an error program in the computer via the priority comparator.

Alternatively, the addresses can be chosen, so that for each set of addresses for a program, a top plurality of binary digit places in each address is constant, the constant differing from set to set. To take a simple case, in a main store 2 having 500 storage sections, involving ten binary digit positions, a set of addresses could be chosen so that every address therein started (most significant digit on the left) with 00001 . . ., and another could be chosen so that every address therein started with 00010. The address comparator 21 would be automatically set in accordance with the set of addresses allocated for a program, and each new instruction address, would be automatically compared in the address comparator 21 to ensure that it is within the permitted limits. If the comparison failed, the error signal will be given via error line 55. In this way, the use of incorrect instructions or data is positively avoided.

In allocating parts of main store 2 for different programs, the well known technique used is to divide the store into parts each comprising a number of "word" stores large enough to provide for all the requirements likely to be met in carrying out a complete program, and to program different subsections of an allocated part to different phases of a process. The subsections may comprise one or more store "words" each having a code address, and the code addresses of allocated subsections are incorporated in the process program sent to the equipment. The code addresses are checked by the store address comparator 21 to ensure that they occur within the limits of the store part allocated to the programs.

The computer shown in the drawing is provided with a single arithmetic unit 7, but it is clear that a plurality of arithmetic units could be provided, in which case programs awaiting processing will be dealt with, in order, as arithmetic units become free.

The arithmetic units themselves, when more than one was free at a time, could be allocated arbitrarily, or in a predetermined sequence in well known manner.

The particular embodiment described is a computer, but clearly the invention is equally applicable to other types of data-processing-equipment in which similar problems arise, and it is to be understood that the invention includes within its scope all such data processing equipments.

While the invention has been described in relation to a computer provided with a single common arithmetic unit, it is applicable to computers comprising a plurality of arithmetic units in which case the arithmetic units will be allocated as they become free to stored programs according to their priorities as determined by the Director.

What I claim is:

A program-controlled data processing system, wherein a number of program interrupt signal conditions may each be assigned any of a number of different priorities, the number of assignable priorities being less than the number of interrupt conditions, including:

(1) storage means, for storing a number of programs of instructions, each of said programs having a priority assignable thereto;

(2) address means, connected to said storage means, for accessing instructions in selected ones of said number of programs;

(3) control means, connected to said address means, operable to control the selections of ones of said programs;

(4) execution means, connected to aforesaid storage, address and control means, operable by said control means to execute instructions in the program currently selected by said control means, accessed by said address means from said storage means;

(5) a plurality of input channels, for supplying signals including a first number of interrupt signal conditions; and (6) interrupt means, connected to said control means, said execution means and said input channels, for assigning priorities to the interrupt signal conditions on said input channels and responsive to the relative priorities of the currently selected program and the interrupt signal conditions for controlling the interruption of the currently selected program and the initiation of another program, comprising:

(a) a matrix, connected to said input channels, having a first number of inputs equal to said first number of interrupt signal conditions supplied by said input channels and having a second number of output priority channels each representing a different priority, said second number being less than aforesaid first number, connected to selected ones of said inputs for assigning, in accordance with said connections, to each of said input channels any of said priorities;

(b) a priority comparator, connected to said control means and to said matrix output priority channels, for comparing the relative priorities of the currently selected program and the interrupt signal conditions and generating, as a result of such comparison, a control signal when the priority assigned to an interrupt signal condition on an input channel is higher than the priority of the currently selected program; and (c) interrupt controls and a waiting list register, connected to said control means, execution means, address means, priority comparator means and said input channels, operable by said control signal to interrupt the currently selected program and initiate another program in accordance with signals supplied by said input channels.

References Cited by the Examiner

UNITED STATES PATENTS

| | | | |
|---|---|---|---|
| 2,797,862 | 7/1957 | Andrews et al. | 235—157 X |
| 2,952,731 | 9/1960 | Wright et al. | 178—2 |
| 3,079,082 | 2/1963 | Scholten et al. | 235—157 |

OTHER REFERENCES

Lourie et al.: Arithmetic and Control Techniques in a Multiprogram Computer, Proceedings of the Eastern Joint Computer Conference, December 1959, pp. 75 to 81.

Pp. 560–564, March 1961, B.R.L. Report No. 1115, 1961.

Pp. 13–17, November 1959, "Multiprogramming STRETCH: Feasibility Consideration," Codd et al., Communications of the A.C.M., vol. 2, No. 11.

Pp. 20–22, Dec. 10–12, 1956, "Design Objectives for the IBM Stretch Computer," Dimwell.

Pp. 16–19, "Univac-Larc, the Next Step in Computer Design," Eckert.

Pp. 174–180, Dec. 3–5, 1958, "Programming Design Features of the GAMMA 60 Computer," Dreyfuss, Proceedings of the E.J.C.C.

ROBERT C. BAILEY, *Primary Examiner.*

CORNELIUS D. ANGEL, MALCOLM A. MORRISON, *Examiners.*